United States Patent Office 3,598,722
Patented Aug. 10, 1971

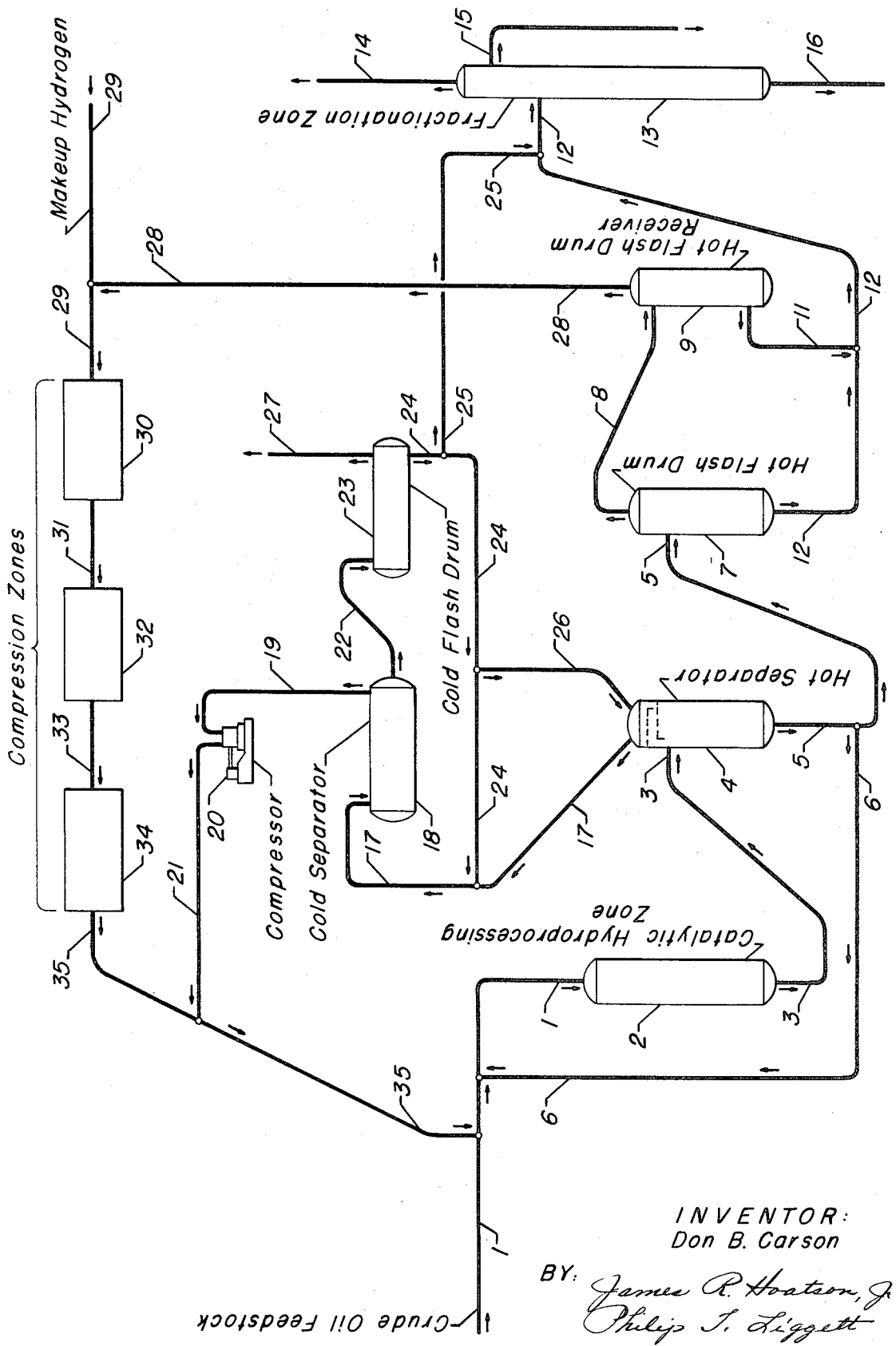

3,598,722
CATALYTIC HYDROPROCESSING OF A
PETROLEUM CRUDE OIL FEEDSTOCK
Don B. Carson, Mount Prospect, Ill., assignor to Universal
Oil Products Company, Des Plaines, Ill.
Filed Mar. 10, 1969, Ser. No. 805,705
Int. Cl. C10g 13/00
U.S. Cl. 208—108
3 Claims

ABSTRACT OF THE DISCLOSURE

A petroleum crude oil feedstock is catalytically hydroprocessed into more valuable products while, simultaneously, recovery and reuse of hydrogen is achieved by means of a combination process including the steps of catalytic hydroprocessing, separation, hydrogen recovery, and fractionation.

BACKGROUND OF THE INVENTION

This invention relates to a process for the catalytic hydroprocessing of a petroleum crude oil feedstock. This invention specifically relates to a process for the catalytic hydroprocessing of a petroleum crude oil feedstock into more valuable products and the simultaneous recovery and reuse of hydrogen utilizing an interrelated and interdependent series of processing steps including the steps of catalytic hydroprocessing, separation, hydrogen recovery, and fractionation.

In high pressure processes that consume or produce hydrogen, some hydrogen is normally found in the liquid products by having been equilibrium present or entrained in the liquid products. Our combination process utilizes a method of recovery and reusing this hydrogen so contained by less expensive capital and operating means than would be conventionally employed and, further, facilities for the scrubbing and removing of hydrogen sulfide and other sulfur containing compounds have been eliminated by the method of our process.

By the term "catalytic hydroprocessing" I mean to include any processing of a petroleum fraction under elevated hydrogen pressure involving a consumption of hydrogen by the petroleum fraction. This naturally includes hydrocracking, hydrotreating, and hydrorefining or hydropurification.

In typical prior art processes, hydrogen is lost from the process in the liquid from the hot separator and the cold separator that usually follows the catalytic hydroprocessing zone. This hydrogen gas usually ends up in a hot flash gas condensate drum and the cold flash condensate drum. These gases can be recovered and reused by compression or else burned as fuel or, they can be used, after clean-up, as charge to a hydrogen manufacturing unit. However, we have found that in our process, hydrogen from a hot flash drum receiver may be taken directly to a makeup hydrogen stream emanating from a low pressure source for subsequent reuse in the process. We have further found that sulfur and sulfur containing compound removal means are not necessary in our process due to the presence of an enrichment liquid recycle, hereinafter described in detail, which provide a built-in control for the sulfur containing impurities.

SUMMARY OF THE INVENTION

It is an object of this invention to provide a process for the catalytic hydroprocessing of a petroleum crude oil feedstock into more valuable products and for the simultaneous recovery and reuse of hydrogen.

Therefore, the present invention provides a process for the catalytic hydroprocessing of a petroleum crude oil feedstock into more valuable products and the simultaneous recovery and reuse of hydrogen which comprises the steps of: (a) introducing said feedstock into a catalytic hydroprocessing zone maintained under catalytic hydroprocessing conditions including the presence of hydrogen; (b) continuously withdrawing and passing to a first separation zone from said catalytic hydroprocessing zone an effluent stream containing a hydrogen-rich gaseous fraction and a hydrocarbon-rich fraction; (c) separating in said separation zone said hydrogen-rich gaseous fraction from said hydrocarbon-rich fraction; (d) passing said hydrogen-rich gaseous fraction to a second separation zone wherein said fraction is separated into hydrogen, and an enrichment stream comprising normally gaseous components, normally gaseous hydrocarbons, and normally liquid hydrocarbons; (e) passing a first portion of said enrichment stream into a fractionation zone, and passing a second portion of said stream to said first separation zone, and passing the remaining portion of said stream to said second separation zone; (f) passing said hydrocarbon-rich fraction of Step (c) to a flash zone wherein said fraction is separated into a hydrogen fraction and a normally liquid hydrocarbon fraction; (g) admixing said normally liquid hydrocarbon fraction of Step (f) with said enrichment stream of Step (e) passing to said fractionation zone; (h) commingling said hydrogen fraction of Step (f) with a makeup hydrogen stream emanating from a low pressure source; (i) compressing in a compression zone the resultant combined hydrogen stream formed in Step (h) to substantially the same operating pressure imposed upon said catalytic hydroprocessing zone; (j) admixing the compressed combined hydrogen stream of Step (i) with said hydrogen of Step (d) prior to returning into said catalytic hydroprocessing zone of Step (a); and, (k) recovering from said fractionation zone valuable catalytically hydroprocessed products.

As will be described hereinafter in greater detail, the essence of our invention encompasses the recovery and reuse of hydrogen in a catalytic hydroprocessing unit wherein the recovered hydrogen is recovered from a hot flash drum receiver and is admixed prior to compression with added makeup hydrogen emanating from a low pressure source and the full utilization of an enrichment stream to accomplish the elimination of sulfur containing compound removal means.

The term "petroleum crude oil feedstock" is meant to include any oils extracted from tar sands, topped or reduced crudes, vacuum residuum (vacuum tower bottoms products) and those petroleum crude oils referred to as "black oils" which contain a significant quantity of asphaltic materials and high concentrations of sulfur, as well as large quantities of nitrogenous compounds and high molecular weight organo metallic compounds principally comprising nickel and vanadium. These "black oils" include those hydrocarbon charge stocks of which at least 10% by volume boils above a temperature of about 1050° F. These black oils usually have an API gravity, at 60° F., of less than 20.0 and further, sulfur concentrations are usually more than 1% by weight and often in excess of 3% by weight.

As set forth hereinabove, this invention relates to a process for the catalytic hydroprocessing of a petroleum crude oil feedstock into more valuable products and the simultaneous recovery and reuse of hydrogen. Many catalysts are suitable for the catalytic hydroprocessing of a petroleum crude oil feedstock. A particularly preferred catalytic hydroprocessing catalyst which may be utilized in the process of the present invention can be characterized as comprising a metallic component possessing a hydrogenation activity which component is composited with a refractory inorganic oxide carrier material which may be of synthetic or metallic origin. The precise composition and method of manufacturing the catalytic composition is not considered to be an essential element of the present process.

However, a particularly suitable catalyst for use in our invention would comprise a refractory inorganic oxide carrier material such as alumina, silica, zirconia, magnesia, titania, boria, strontia, hafnia, etc., and mixtures thereof including silica-alumina, silica-zirconia, silica-magnesia, silica-titania, alumina-zirconia, silica-alumina-boron phosphate, alumina-magnesia, alumina-titania, magnesia-zircona, titania-zirconia, magnesia-titania, silica-alumina-zirconia, silica-alumina-magnesia, silica-alumina-titania, silica-magnesia-zirconia, silica-alumina-boria, etc. It is preferred to utilize a carrier material containing at least a portion of silica, and it is particularly preferred to utilize a composite of alumina and silica. Suitable metallic components for hydrogenation activity are those selected from the group consisting of the metals of Groups VI-B and VIII of the Periodic Table. Thus, the catalytic composition may comprise one or more metallic components selected from the group consisting of molybdenum, tungsten, chromium, iron, cobalt, nickel, platinum, palladium, iridium, osmium, rhodium, ruthenium, and mixtures thereof. The concentration of the catalytically active metallic component or components is primarily dependent upon the particular metal utilized as well as the characteristics of the charge stock. The Group VI-B metal, such as chromium, molybdenum, or tungsten is usually preferred in an amount from about 0.5% to about 10% by weight of the catalyst. Group VIII metals, which may be divided into two subgroups, namely the iron subgroup and the noble metal subgroup, are preferred in an amount of from about 0.1% to 10% of the total catalyst. When an iron subgroup metal such as iron, cobalt, or nickel, etc. is employed, it is preferred in an amount of from about 0.2% to 10.0% by weight. When a noble metal subgroup metal such as platinum, palladium, or iridium, etc. is employed, it is preferred to utilize an amount within the range of from about 1.0% to about 5.0% by weight of the total catalyst.

When utilizing a catalytic hydroprocessing catalyst such as described above, the catalytic hydroprocessing reaction zone containing the catalyst is usually maintained under catalytic hydroprocessing conditions including a temperature of from about 600° F. to about 1000° F. as measured at the inlet to the fixed bed of catalyst disposed within the catalytic hydroprocessing reaction zone and preferably at a temperature of about greater than 700° F. The catalytic hydroprocessing zone is maintained at a selected operating pressure which is usually maintained at about 1000 p.s.i.g. and preferably in the range of from 1000 to 4000 p.s.i.g. Hydrogen is passed to the catalytic hydroprocessing zone in an amount of from about 2000 to 40,000 s.c.f./bbl. and preferably of from about 2000 to 20,000 s.c.f. bbl. at the selected operating pressure. The liquid hourly space velocity (being defined as the volume of liquid hydrocarbon charge per hour per volume of catalyst disposed within the reaction zone) is maintained in the range of from about 0.25 to about 4.0. The catalytic hydroprocessing zone may contain a plurality of catalytic hydroprocessing reactors. These reactors may be arranged in parallel flow, in series flow, or in a combination of series and parallel flow depending upon the particular petroleum crude oil feedstock to be hydroprocessed.

The first separation zone is usually referred to as a hot separation zone and is usually maintained as substantially the same pressure imposed upon the catalytic hydroprocessing zone. The first separation zone is maintained usually at a temperature of from about 650° F. to about 800° F. The hot separation zone may contain trays, baffles, and the like.

The second separation zone is usually referred to as a cold separation zone and is maintained usually at a temperature below about 700° F. and preferably below about 150° F. and is maintained at substantially the same operating pressure as the catalytic hydroprocessing zone.

The flash zones utilized in our process are usually referred to as a cold flash system and a hot flash system. The cold flash system follows the cold separator and is maintained at a substantially reduced pressure in the range of from about atmospheric pressure to 100 p.s.i.g. The hot flash system is maintained at higher pressures than the cold flash system described above. For example, pressures in the range of from about atmospheric pressure to about 350 p.s.i.g. are preferred. As the names of these systems indicate, the hot flash system is maintained at higher temperatures than the cold flash system. The hot flash system in our process contains a vessel called the hot flash drum receiver wherein hydrogen is recovered and passed directly to the makeup hydrogen stream emanating from a low pressure source. This admixture is then passed to a compression zone which may be a series of compression zones successively stepping up the pressure of the material passing to the compression zone prior to recycle to the catalytic hydroprocessing zone. In this manner, low pressure makeup hydrogen, for example, which may be obtained at a pressure of from about atmospheric pressure to about 450 p.s.i.g., may be successively stepped up in a series of compression zones so that at the discharge end of the last compression zone, substantially the same operating pressure as the catalytic hydroprocessing unit is achieved. As will be described hereinafter in a preferred embodiment, we prefer to utilize a series of three compression zones wherein the recovered hydrogen from our process is admixed with makeup hydrogen prior to compression in a compression zone. For example, we prefer our makeup hydrogen stream to be obtained at a pressure of from about atmospheric pressure to about 200 p.s.i.g. and the first compression zone is maintained so that the stream is compressed to about 485 p.s.i.g. Our second compression zone is maintained so that discharge pressure from this zone may be obtained at about 1045 p.s.i.g. Our third compression zone is maintained so that discharge pressure from this zone is obtained at a pressure of at least 2250 p.s.i.g.

The fractionation zone utilized in our method may be of a conventional type and is utilized for obtaining the valuable catalytically hydroprocessed products from the catalytic hydro-processing reaction. The fractionation zone may be a series of fractional distillation columns including vacuum distillation columns and the fractionation zone may provide recycle back to the catalytic hydroprocessing zone with any one of a number of recycle streams or the fractionation zone may be utilized strictly for the recovery of all of the liquid products.

Our invention can be most clearly described and illustrated with reference to the attached drawing which is a schematic representation of one specific embodiment of the invention.

DESCRIPTION OF THE DRAWING

Referring now to the drawing, the petroleum crude oil feedstock is passed via line 1 to catalytic hydroprocessing zone 2 wherein a catalytic hydroprocessing catalyst described above is disposed therein. The reaction zone may be equipped with heat transfer means, baffles, trays, heating means, etc. The catalytic hydroprocessing zone may contain a plurality of catalytic hydroprocessing reactors in series, in parallel, or in combinations thereof. The reaction zone is preferably of the adiabatic type and thus feed to the reaction zone will preferably be provided with the requisite amount of heat prior to passage thereof to said reaction zone. The actual operation of the reaction zone may be upflow, downflow, or radial flow. At the end of the desired residence time in the reactor, an effluent stream containing a hydrogen-rich gaseous fraction and a hydrocarbon-rich fraction is removed from catalytic hydroprocessing zone 2 via line 3 and passes to hot separator 4.

In hot separator 4, the effluent is separated into a hydrogen-rich gaseous fraction and a hydrocarbon-rich fraction.

The hydrogen-rich gaseous fraction is then passed via line 17 to cold separator 18 wherein the hydrogen-rich gaseous fraction is separated into hydrogen, and an enrichment stream comprising normally gaseous components including sulfur containing compounds and ammonia containing compounds, normally gaseous hydrocarbons, and normally liquid hydrocarbons.

In the drawing, hydrogen is represented as being removed from cold separator 18 via line 19 which passes to recycle gase compressor 20 and then via line 21 for recycle to the catalytic hydroprocessing zone. The stream comprising normally gaseous components, normally gaseous hydrocarbons, and normally liquid hydrocarbons, passes then from cold separator 18 via line 22 to cold flash drum 23 wherein at least a portion of the normally gaseous components (preferably ammonia containing compounds) may be removed from the process via line 27 while the balance of the enrichment stream passes via lines 24 and 25 for passage to the fractionation zone, and for passage to the cold separator via lines 24 and 17 and for passage to hot separator 4 via lines 24 and 26.

The hydrocarbon-rich fraction that was separated in separation zone 4 is then passed via line 5 to hot flash drum 7 wherein said fraction is separated into a hydrogen fraction and a normally liquid hydrocarbon fraction. If desired, a portion of the fraction in line 5 may be recycled to the catalytic hydroprocessing zone via lines 5, 6, and 1. The hydrogen fraction, which contains a quantity of normally liquid hydrocarbons is then passed via line 8 to flash drum receiver 9 wherein the normally liquid hydrocarbon fraction is removed via line 11 for admixture with the normally liquid hydrocarbon fraction in line 12 from hot flash drum 7 which passes in admixture with the enrichment stream from line 25 and passes to fractionation zone 13.

The hydrogen fraction removed from hot flash drum 7 and hot flash drum receiver 9 passes via line 28 to a commingling step wherein makeup hydrogen emanating from a low pressure source admixes in line 29 and passes to first compression zone 30. The hydrogen fraction-makeup hydrogen stream admixture is then compressed in the first compression zone 30 and passed via line 31 to the second compression zone 32. The compressed admixture from the first compression zone is further compressed to an intermediate pressure. The admixture, now at an intermediate pressure is then passed via line 33 from compression zone 32 to compression zone 34 wherein the admixture is compressed to substantially the same operating pressure imposed upon the catalytic hydroprocessing zone. This stream is then passed via line 35 to admix with the crude oil feedstock passing to the catalytic hydroprocessing zone 2. As a matter of convenience, the recycle hydrogen via line 21 may be admixed with the hydrogen from compression zone 34 in line 35 prior to passing to the catalytic hydroprocessing zone.

Fractionation zone 13 may be a series of conventional fractional distillation columns including vacuum distillation columns. In fractionation zone 13, desired catalytically hydroprocessed products are removed from the process via lines 14, 15, and 16 and are subsequently recovered. If desired, a heavy bottoms fraction may be removed from fractionation zone 13 via line 16 and passed to commingle with the petroleum crude oil feedstock in line 1 for recycle to the catalytic hydroprocessing zone.

By practicing the process of this invention, a savings of about 50% of the hydrogen previously lost in units of this type has been achieved inasmuch as substantially no hydrogen is leaving the process. Further, the hydrogen being recovered from cold separator 18 and passing through recycle gas compressor 20 has a purity of at least 80% hydrogen.

It is to be understood throughout the entire discussion of our invention that the references to substantially the same operating pressure of the catalytic hydroprocessing zone refers to and is intended to connote that, pressure drop, only as a result of the flow of the fluids through the typical catalytic hydroprocessing unit, is the reason for slightly lower pressures being present in subsequent vessels in the flow scheme. No specific intentional means has been employed to reduce this pressure except where specifically indicated in the above discussion.

PREFERRED EMBODIMENT

In a particularly preferred embodiment of this invention, this invention provides a process for the catalytic hydroprocessing of a petroleum crude oil feedstock into more valuable products and the simultaneous recovery and reuse of hydrogen which comprises the steps of: (a) introducing said feedstock into a catalytic hydroprocessing zone maintained under catalytic hydroprocessing conditions including the presence of hydrogen; (b) continuously withdrawing and passing to a hot separation zone from said catalytic hydroprocessing zone an effluent stream containing a hydrogen-rich gaseous fraction and a hydrocarbon-rich fraction; (c) separating in said separation zone said hydrogen-rich gaseous fraction from said hydrocarbon-rich fraction; (d) passing said hydrogen-rich gaseous fraction to a cold separation zone wherein said fraction is separated into hydrogen, and an enrichment stream comprising normally gaseous components, normally gaseous hydrocarbons, and normally liquid hydrocarbons; (e) passing a first portion of said enrichment stream into a fractionation zone and passing a second portion of said stream to said hot separation zone and passing the remaining portion of said stream to said cold separation zone; (f) passing said hydrocarbon-rich fraction of Step (c) to a hot flash zone wherein said fraction is separated into a hydrogen fraction and a normally liquid hydrocarbon fraction; (g) admixing said normally liquid hydrocarbon fraction of Step (f) with said enrichment stream of Step (e) passing to said fractionation zone; (h) commingling said hydrogen fraction of Step (f) with a makeup hydrogen stream emanating from a low pressure source prior to passing to a first compression zone; (i) compressing the hydrogen fraction-makeup hydrogen stream admixture of Step (h) in said first compression zone to a first intermediate pressure; (j) passing the compressed admixture of Step (i) into a second compression zone wherein said admixture is further compressed to a second intermediate pressure; (k) passing the further compressed admixture into a third compression zone wherein said admixture is compressed to substantially the same operating pressure imposed upon said catalytic hydroprocessing zone; (l) admixing the admixture of Step (k) with said hydrogen of Step (d) prior to returning into said catalytic hydroprocessing zone of Step (a); and, (m) recovering from said fractionation zone valuable catalytically hydroprocessed products.

Thus, it is apparent that the present invention provides a process for the catalytic hydroprocessing of a petroleum crude oil feedstock into more valuable products and the simultaneous recovery and reuse of hydrogen utilizing an interrelated and interdependent series of processing steps. Maximum utilization of the existing hydrogen in the process is therefore achieved.

I claim as my invention:

1. A process for the catalytic hydroprocessing of a petroleum crude oil feedstock, containing sulfur and nitrogen contaminants, into more valuable products and the simultaneous recovery and reuse of hydrogen which comprises the steps of:
   (a) introducing said feedstock, in admixture with hydrogen obtained as hereinafter specified, into a catalytic hydroprocessing zone maintained at a temperature above about 600° F. and a pressure above about 1000 p.s.i.g. sufficient to result in consumption of hydrogen by the petroleum fraction;
   (b) passing the effluent from said hydroprocessing zone to a first separation zone maintained at a temperature of about 650° F. to 800° F. and a pressure substantially the same as the pressure of said hydroprocessing zone, and therein separating said effluent into a hydrogen-rich gaseous fraction and a hydrocarbon-rich fraction;

(c) passing said hydrogen-rich gaseous fraction to a second separation zone maintained at a temperature below about 150° F. and a pressure substantially the same as the pressure of said hydroprocessing zone, and therein separating said hydrogen-rich fraction into hydrogen and a hydrocarbon stream containing sulfur and ammonia contaminants;

(d) passing said hydrocarbon stream of Step (c) to a cold flash zone maintained at a pressure of about atmospheric to 100 p.s.i.g. and therein flashing said stream to provide a vent gas phase containing said contaminants and an enrichment stream comprising hydrocarbons;

(e) passing a first aliquot portion of said enrichment stream into a fractional distillation zone, passing a second aliquot portion of said enrichment stream to said first separation zone, and passing the remaining aliquot portion of said enrichment stream into said second separation zone;

(f) passing said hydrocarbon-rich fraction of Step (b) to a hot flash zone maintained at a pressure of about atmospheric to 350 p.s.i.g. and therein flashing said fraction to provide a hydrogen fraction and a normally liquid hydrocarbon fraction;

(g) admixing said normally liquid hydrocarbon fraction of Step (f) with said enrichment stream of Step (e) passing to said fractional distillation zone;

(h) commingling said hydrogen fraction of Step (f) with a make-up hydrogen stream emanating from a low pressure source;

(i) compressing the resultant combined hydrogen stream formed in Step (h) to substantially the same operating pressure imposed upon said catalytic hydroprocessing zone;

(j) admixing the compressed combined hydrogen stream of Step (i) with said hydrogen of Step (c) and returning the resultant mixture to said catalytic hydroprocessing zone of Step (a); and, (k) recovering from said fractional distillation zone valuable catalytically hydroprocessed products.

2. The process according to claim 1 wherein a heavy liquid hydrocarbon fraction from said fractional distillation zone is recycled and admixed with said petroleum crude oil feedstock.

3. The process according to claim 1 wherein at least a portion of the hydrocarbon-rich fraction of Step (b) is recycled to the catalytic hydroprocessing zone in admixture with said petroleum crude oil feedstock.

References Cited
UNITED STATES PATENTS 3,444,072  5/1969  Lehmann _____ 208—108

DELBERT E. GANTZ, Primary Examiner

R. BRUSKIN, Assistant Examiner

U.S. Cl. X.R.

23—210; 208—102